Oct. 27, 1964  L. ALAMPRESE  3,154,104
ROLLING GATE VALVE
Filed Dec. 17, 1962  2 Sheets-Sheet 1

INVENTOR.
LEO ALAMPRESE
BY Joseph E Ryan
ATTORNEY

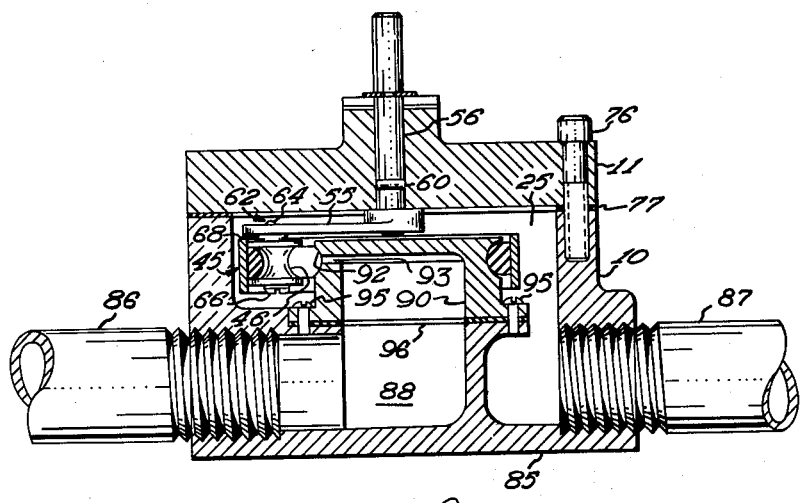
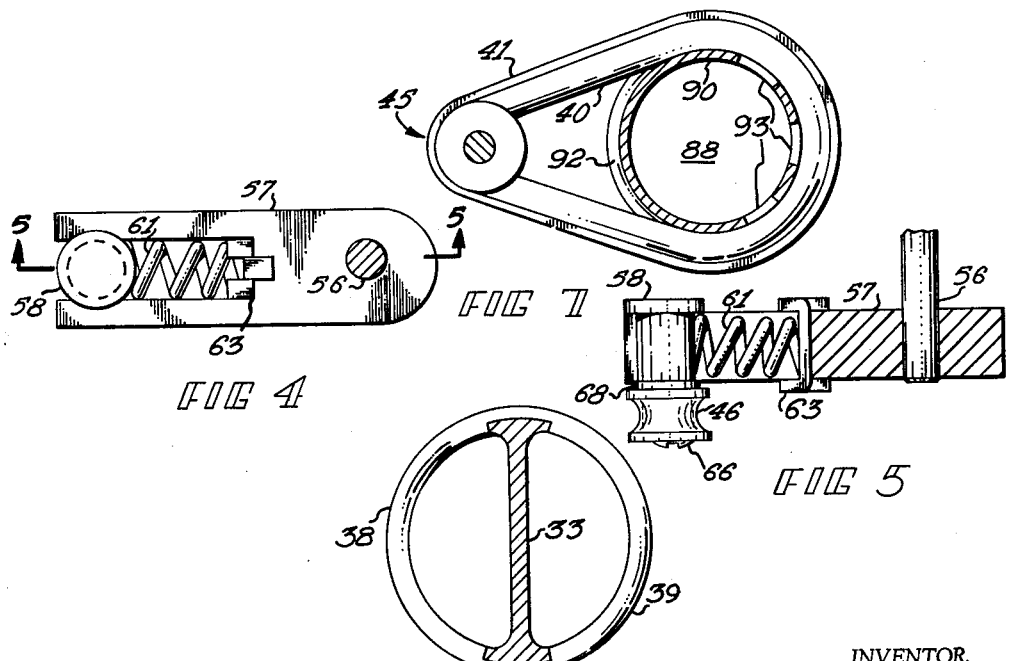

United States Patent Office 3,154,104
Patented Oct. 27, 1964

1

3,154,104
ROLLING GATE VALVE
Leo Alamprese, Elmhurst, Ill., assignor to Honeywell Inc.,
a corporation of Delaware
Filed Dec. 17, 1962, Ser. No. 245,101
3 Claims. (Cl. 137—625.46)

My invention relates to gate valves and more particularly to an improved rolling type gate valve.

While gate valves and rolling gate valves are known, they have not received wide application because of the difficulty in sealing the same, in frictional forces and their general deficiency in positive valving action. The present invention is directed to an improved rolling gate type valve which overcomes these difficulties and provides a simplified valving design with positive shutoff, low friction in operation and a low force input requirement. In addition, the valve design permits long life and application to either unidirectional or bidirectional motors. In addition, the valve design is applicable to two, three-way or plural valve configurations.

The basic concept of this valve is to have direction of flow such as to tend to seat the band on the port. In rolling the gate, band or valve closure member band off of the port or seat in going from the closed to the open position, the band or valve closure member progressively overcomes the seating force of the fluid pressure. As each point on the valve closure member is unseated and moves away from the seat, the pressure and resultant forces upon it are relieved. Therefore, the valve closure member in rolling to the open position does not have to overcome, all at once, the cumulative effect of the total pressure on the valve closure member. This is how the low operating force is achieved.

It is also possible where low pressures are involved and there is enough tension on the valve closure member that the flow can be reversed. In a three-way valve configuration this permits a simplified mixing valve design.

It is therefore an object of this invention to provide an improved rolling gate valve.

Another object of this invention is to provide in a simplified gate valve design means for insuring positive seal off of the valve.

Still another object of this invention is to provide an arrangement for eliminating wear and reducing friction by positively driving the valve closure member.

In addition, it is an object of this invention to provide an improved rolling gate valve applicable for unidirectional control movements or bidirectional control movements.

A further object of this invention is to provide a simplified valve design which may be used as a diverting or mixing valve.

These and other objects of this invention will become apparent from a reading of the attached description together with the drawings wherein:

FIGURE 3 is a sectional view of a portion of the valve seat of the valve shown in FIGURES 1 and 2;

FIGURE 4 is a plan view of a modified operating arm of the valve;

FIGURE 5 is a sectional view in elevation of the operating arm in FIGURE 4;

FIGURE 6 is a sectional view of another embodiment of the invention; and

FIGURE 7 is a sectional view of the valve seat of the valve shown in FIGURE 6.

2

Figure 1:
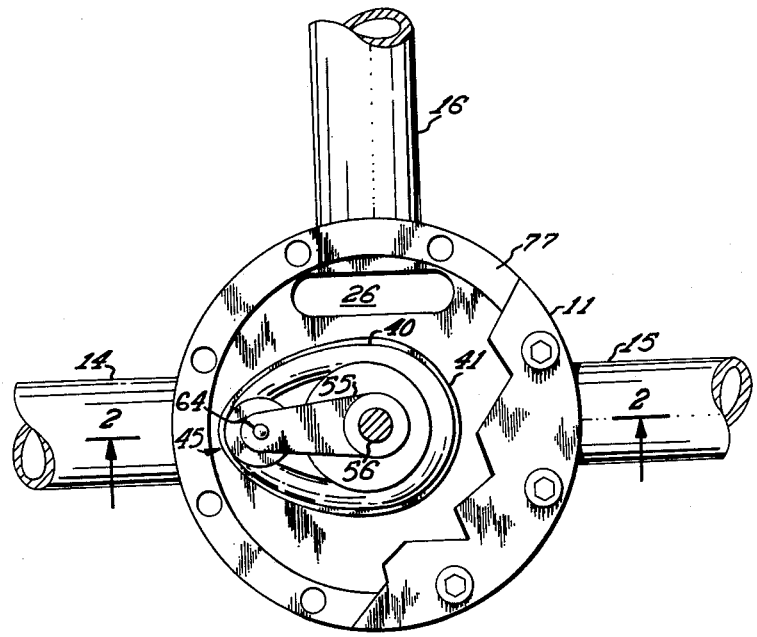
FIGURE 1 is a plan view of an embodiment of the valve with portions of the cover broken away.
Figure 2:
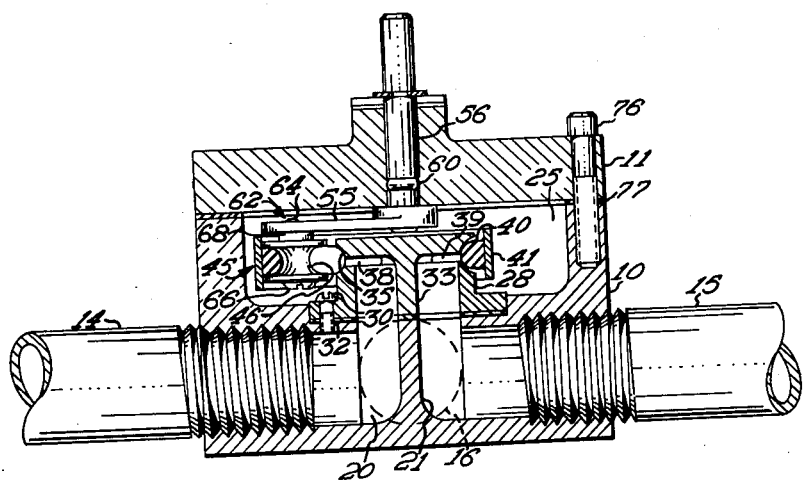
FIGURE 2 is a side elevation view of the valve of FIGURE 1 in section taken along the lines 2—2.

The embodiment of the improved rolling gate type valve shown in FIGURES 1, 2 and 3 utilizes a multi-part cylindrical valve body shown in FIGURES 1 and 2 as including base parts or body parts 10 and cover part 11. The base or body part 10 is shown as including a pair of outlet passages 14 and 15 and an inlet passage indicated at 16 in FIGURE 1. The outlet passages 14, 15 extend into the body part 10 and terminate in a circular center section indicated generally at 20 which three-way valve embodiment has a divider section 21 integral therewith. Inlet passage 16 is connected to a main inlet recess 25 in the base part 10 through a translationally extending passage indicated at 26 in FIGURE 1. A central portion or recess 20 in the base part 10 has mounted thereon a cylindrical seat part 28 which is secured to and sealed on the center of the base 10 over the recess 20 through suitable screw 30 and sealing means 32. The seat section in the three-way valve also includes a downwardly extending divider portion 33 and the seat portion forms a divider between the first or center recess communicating with the outlet passages 14, 15 and the inlet recess or chamber 25 in the base part 10 with the exception of the flow passages through the seat to be hereinafter identified. Flow through the valve is normally in a direction to maintain the valve closed and insure positive seal off. As will best be seen in FIGURES 2 and 3, the seat portion or section of the valve which is generally cylindrical in form has a peripheral or circular groove 35 extending around the exposed portion of the same within the chamber 25. In addition, this grooved section has a pair of passages 38, 39 therein which provide for communication between the inlet and outlet of the valve or the passages 20 and the inlet chamber 25. As will be seen in FIGURE 3, these passages extend less than 180 degrees around the peripheral surface of the seat section and are diametrically positioned to perform their three-way valving function. While single passages are shown for each direction of flow, it will be understood that a plurality of openings or passages may be utilized in its place.

The valve closure member or rolling gate which cooperates with the valve seat 28 is in the form of an annular ring 40 of soft pliant material such as rubber backed by a flexible metal band 41 to which the pliant material is suitably secured such as by bonding. This valve closure member is adapted to fit into the grooved periphery 35 of the valve seat over approximately 180 degrees of its exposed surface and be looped around an idler or pulley 45 which also has a grooved surface 46 into which the band 40 is positioned. The dimensions of the respective grooves are such that the periphery 35 of the valve seat has a larger radial dimension than the circular or cross sectional configuration of the valve closure member 40 such that the valve closure member fits over or covers the openings 38, 39 in the grooved periphery 35 in section 28 and positively seals the same with a minimum of seal off area as it rolls thereon. With the application of tension, the valve closure member is slightly deformed to aid in this seal off. The grooved periphery of the idler or pulley 45 is of larger dimension than the cross section or radius of the valve closure member 40 and hence the band 40 fits down into the grooved periphery and rests with its metal backing on the high surfaces of the pulley so that metal to metal contact is made at this point. The pulley or idler 45 is adapted to be moved in an arcuate or circular path about the center of the recess 25 and the valve seat 28 therein so that the rolling gate will roll on the grooved opening 35 of the valve seat about its periphery, opening and closing the respective passages 38, 39 therethrough to provide for communication of one or the other of the outlets 14, 15 with the recess 25 and hence the inlet passage 16. While the direction of flow through the valve is normally in the direction to insure positive seal off, the progressive opening of the valve as the band is rolled or moved relative to the valve seat relieves this pressure to permit low operating force requirements.

The idler is mounted on an actuating arm 55 which is secured to a shaft 56 journaled in the cover portion 11 of the valve body and sealed therein through a suitable sealing means such as O-ring 60. The arm 55 mounts a journal pin 62 upon which the idler or pulley is journaled to rotate thereon. As shown in FIGURE 2, this shaft has a threaded portion indicated at 64 which threads into a tapped aperture in the arm 55 to mount the same and a head portion 66 which holds the idler in position along with a spacer member 68 relative to the grooved periphery 35 of the valve seat 28. By rotation of the shaft 56 in an arcuate or circular manner about the valve seat, the valve closure member is caused to roll or move on the surface of the valve seat and in the grooved periphery 35 thereof. By providing an engagement between the idler and the metal backing 41 of the valve closure member, stress may be placed on the valve closure member to insure positive seal off without providing or necessitating undue strain and wear on the valve closure band 40.

The cover member 11 is secured to the base 10 of the valve body through suitable means such as screws indicated at 76 and suitable sealing means such as gaskets 77 is positioned therebetween to insure positive seal off. As will be seen in FIGURE 3 which is a section of the valve seat taken through the grooved openings 38, 39, a portion of the openings 38, 39 will be covered at all times since the band extends slightly greater than 180 degrees about the periphery of the valve seat. The divider section 33 permits communication of one or the other of the outlets 14, 15 with the inlet passage 16 and the device will be operated by rotating the input shaft 180 degrees such that the valve closure member will be moved from a position of covering one of the openings in the valve seat to a position of covering the other valve opening providing a conventional three-way valve configuration.

A modification of the idler 46 mounting on the operating arm connected to shaft 56 is shown in FIGURES 4 and 5. Where sufficient force or bias is not supplied to the band 41 to insure with the inlet pressure positive seal off of the valve, the idler itself may be spring mounted in the operating arm. Thus, in FIGURES 4 and 5, a modified arm 57 is shown which is connected to shaft 56. Arm 57 has a notch 58 therein in which is slidably mounted the idler or pulley 45, the pulley being mounted on the journal pin 62 which is threaded into a slidable plate 59 on one surface of arm 57 with the spacer 68 being positioned between the pulley and the other surface for spacing and support purposes. A spring 61 bearing against a positioning bracket 62 in the arm engages the pin 62 to bias the idler 45 in the arm. The head portion 66 of pin 62 retains the idler in position.

The embodiments shown in FIGURES 6 and 7 present a two-way valve configuration or an on-off type device. Except for modification of a portion of the valve body and seat, the remaining parts of the apparatus are identical with the beforementioned embodiment and hence FIGURE 7 shows only a sectional view of the valve body with these modified parts. Thus, as will be seen in FIGURE 6, the valve body 85 corresponding to valve body part 10 in FIGURES 1 and 2 will have a single outlet 86 and inlet passage 87 therein. The outlet passage 86 will terminate in a central section 88 of the valve body having positioned thereon a valve seat 90 with a grooved periphery 92 in which is positioned the passage or orifice 93. The valve closure member 40, 41, the idler 45, actuating arm 55 and shaft 56 as well as the cover portion 11 are identical with the beforementioned embodiment and are omitted herein for simplicity. The valve seat 90 is secured on the center section 88 of the valve body through suitable means such as screws 95 and sealed thereon with suitable sealing means 96. The valve closure member will open and close said passage to the outlet portion 86 through the center section 88 and valve passage 93 from the chamber 25 within the valve housing which has communicating therewith the inlet passage 87. By uncovering or covering the passages 93 as shown in FIGURE 7, flow from the inlet to outlet will be controlled. As will be seen in FIGURE 7, one or more openings 93 may be included in the circumferential openings of the valve seat or less than 180 degrees of its surface to be controlled by the valve closure member. In this embodiment, the relative dimensions of the valve closure member 40 and the grooved periphery 93 are the same as that in the preceding embodiment such that positive seal off is obtained. Further, the pulley or idler 45 engages the metal backing 41 of the valve closure member causing the same to apply stress or tension to the valve closure member to insure positive seal off and reduce wear. Additional bias may be provided as shown in FIGURES 4 and 5, if required. Rotation of the actuating arm in this embodiment will rotate or move the idler within the recess 25 of the valve body formed by parts 11 and 85 to roll or move the valve closure member or gate on the surface of the valve seat to provide the on-off valving action.

In operation, this improved rotary gate type valve provides a simplified valve structure requiring relatively low force for operation of the same. Rotation of the input shaft 56 through 180 degrees will operate the valve from open to closed position or from one way to a second way of a three-way valve configuration. Flow through the valve may be in a direction to oppose or aid seal off depending upon whether a diverting or mixing valve is desired. The valve is adapted to be utilized in connection with a motor drive having suitable limit control to permit rotation of the shaft through this desired range of rotation. A unidirectional motor may be so utilized with a limit control for on-off or reversed valving or, if desired, a bidirectional motor may be utilized operating over 180 degrees of shaft rotation.

In considering this invention, it should be remembered that the present disclosure is intended to be illustrative only and the scope of the invention should be determined only by the appended claims.

I claim as my invention:

1. A rolling gate valve comprising, a valve body, inlet and outlet passages through said body, a valve seat positioned within said valve body and including a cylindrical section having a recess therein connected to the outlet passage in said valve body, a grooved opening in said cylindrical section on the periphery thereof defining the valve seat, recess means within said valve body communicating with said valve seat and connected to the inlet passage in said valve body, an annular ring type closure member having a flexible metal backing, said closure member being positioned in part in said grooved periphery of said cylindrical section and adapted to be rotated thereon, the grooved periphery of said cylindrical structure having a mating radius with that of said closure member, an operating arm extending through said valve body and sealed thereon, an idler positioned on said operating arm within said recess and engaging said annular closure member to rotate said closure member on said cylindrical section, said idler having a grooved surface of greater diametrical dimension than said closure member to provide for engagement of said metal backing with said idler as said closure member is rotated on said cylindrical section through rotation of the operating arm.

2. A rolling gate valve comprising, a valve body, inlet and outlet passages through said body, a valve seat positioned within said valve body and including a cylindrical section having a recess therein connected to one of said passages in said valve body, a plurality of grooved openings in said cylindrical section on the periphery thereof defining the valve seat, recess means within said valve body communicating with said valve seat and connected to other of said passages in said valve body, an annular ring type closure member of soft pliant material having a flexible metal backing, said closure member being positioned in part in said grooved periphery of said cylindrical section and adapted to be moved thereon, the grooved periphery of said cylindrical structure having a larger radius than that of said closure member, an operating arm extending through the valve body and sealed thereon, a drive means positioned on said operating arm within said recess and engaging said annular closure member to move said ring on said cylindrical structure, said drive means having a grooved surface of greater diametrical dimension than said closure member to provide for engagement of said metal backing with said drive means as said closure member is moved on said cylindrical section through rotation of the operating arm.

3. A rolling gate valve comprising, a valve body, inlet and a pair of outlet passages through said body, a valve seat positioned within said valve body and including a cylindrical section having a pair of recess means therein connected to the outlet passage in said valve body, a grooved opening in said cylindrical section on the periphery thereof defining the valve seat, a recess within said valve body communicating with said valve seat and connected to the inlet passage in said valve body, an annular closure member of soft pliant material having a flexible metal backing, said closure member being positioned in part in said grooved periphery of said cylindrical section and adapted to be rotated thereon, the grooved periphery of said cylindrical structure having a larger radius than that of said closure member, an operating arm extending through the valve body and sealed thereon, a pulley positioned on said operating arm within said recess and engaging said annular closure member to rotate said closure member on said cylindrical section, said pulley having a grooved surface of greater diametrical dimension than said closure member to provide for engagement of said metal backing with said pulley as said closure member is rotated on said cylindrical section through rotation of the operating arm.

References Cited in the file of this patent

UNITED STATES PATENTS

| | | |
|---|---|---|
| 601,634 | Cotter | Apr. 5, 1898 |
| 2,534,577 | Courtot | Dec. 19, 1950 |